(12) United States Patent
Miller et al.

(10) Patent No.: US 12,276,333 B2
(45) Date of Patent: Apr. 15, 2025

(54) GEARBOX ASSEMBLY LUBRICATION SYSTEM FOR A TURBINE ENGINE

(71) Applicant: General Electric Company, Schenectady, NY (US)

(72) Inventors: Brandon W. Miller, Middletown, OH (US); Arthur W. Sibbach, Boxford, MA (US); Andrew Hudecki, Milford, OH (US); Ryan T. Roehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/481,582

(22) Filed: Oct. 5, 2023

(65) Prior Publication Data

US 2024/0426374 A1    Dec. 26, 2024

Related U.S. Application Data

(60) Provisional application No. 63/509,445, filed on Jun. 21, 2023.

(51) Int. Cl.
*F01D 25/18* (2006.01)
*F02C 7/36* (2006.01)
*F16H 57/04* (2010.01)

(52) U.S. Cl.
CPC ............. *F16H 57/045* (2013.01); *F02C 7/36* (2013.01); *F16H 57/0421* (2013.01);
(Continued)

(58) Field of Classification Search
CPC .......................... F16H 57/045; F16H 57/0421
See application file for complete search history.

(56) References Cited

U.S. PATENT DOCUMENTS 2,860,648 A * 11/1958 Harrison ................ B64D 37/22
244/135 R
3,529,698 A * 9/1970 Nelson ................ F16H 57/0447
184/6.12
(Continued)

FOREIGN PATENT DOCUMENTS

DE       2904960 A1    8/1980
EP       3557028 A1    10/2019
(Continued)

*Primary Examiner* — Michael A Riegelman
(74) *Attorney, Agent, or Firm* — Venable LLP; Peter T. Hrubiec; Michele V. Frank

(57) ABSTRACT

A lubrication system for a gearbox assembly for a turbine engine. The gearbox assembly includes a gear assembly including one or more gears and one or more bearings. The lubrication system includes a sump. The sump is a primary reservoir that has a first lubricant level. The lubrication system also includes a secondary reservoir in the gearbox assembly. The secondary reservoir has a second lubricant level that is greater than the first lubricant level. A plurality of drain ports includes a first drain port and a second drain port. The lubrication system fills the secondary reservoir with lubricant between the first lubricant level and the second lubricant level and a portion of the lubricant drains though the second drain port. The one or more gears collects the lubricant to supply the lubricant from the secondary reservoir to the one or more gears or to the one or more bearings.

20 Claims, 9 Drawing Sheets

(52) U.S. Cl.
CPC ..... *F16H 57/0435* (2013.01); *F16H 57/0436* (2013.01); *F16H 57/0442* (2013.01); *F16H 57/0471* (2013.01); *F05D 2260/4031* (2013.01); *F05D 2260/98* (2013.01); *F16H 57/0443* (2013.01); *F16H 57/0486* (2013.01)

(56) References Cited

U.S. PATENT DOCUMENTS

| | | | | |
|---|---|---|---|---|
| 4,170,873 | A * | 10/1979 | Milo | F01D 25/20 60/39.08 |
| 4,245,465 | A * | 1/1981 | Milo | F01D 25/18 60/39.08 |
| 4,845,483 | A * | 7/1989 | Negishi | G06K 15/12 347/225 |
| 5,141,179 | A * | 8/1992 | Gautier | B64D 37/22 137/574 |
| 5,845,483 | A * | 12/1998 | Petrowicz | F02C 7/262 60/788 |
| 6,793,042 | B2 * | 9/2004 | Brouillet | F01D 25/18 184/6.11 |
| 7,213,682 | B2 * | 5/2007 | Gibson | F16H 57/0421 184/6.12 |
| 7,662,059 | B2 * | 2/2010 | McCune | F01D 25/20 184/6.12 |
| 7,815,536 | B2 * | 10/2010 | Jansen | H02K 7/116 290/55 |
| 7,849,668 | B2 * | 12/2010 | Sheridan | F01D 25/20 384/473 |
| 7,883,438 | B2 | 2/2011 | McCune | |
| 8,007,253 | B2 * | 8/2011 | Dooley | F04D 29/047 415/72 |
| 8,307,626 | B2 * | 11/2012 | Sheridan | F01D 25/20 184/29 |
| 8,401,760 | B2 * | 3/2013 | Payne | F02C 7/06 701/30.9 |
| 8,602,165 | B2 * | 12/2013 | Szolomayer | F02C 7/06 137/574 |
| 8,702,373 | B1 * | 4/2014 | Valva | F16H 57/0495 416/174 |
| 8,740,549 | B2 * | 6/2014 | Shashank | F02C 6/12 415/110 |
| 9,086,055 | B2 * | 7/2015 | Subramaniam | F03D 80/70 |
| 9,903,227 | B2 * | 2/2018 | Cigal | F01D 25/18 |
| 10,060,289 | B2 * | 8/2018 | Sheridan | B01D 19/0068 |
| 10,167,873 | B2 * | 1/2019 | Sheridan | F02C 7/32 |
| 10,196,926 | B2 * | 2/2019 | Ketchum | F01D 25/20 |
| 10,208,624 | B2 * | 2/2019 | Duong | F02C 3/107 |
| 10,267,233 | B2 * | 4/2019 | Mastro | F02C 3/107 |
| 10,316,855 | B2 * | 6/2019 | Mastro | F04D 29/329 |
| 10,371,007 | B2 * | 8/2019 | Cigal | F01D 25/20 |
| 10,513,949 | B2 * | 12/2019 | Parnin | F16H 57/0442 |
| 10,526,913 | B2 * | 1/2020 | Roberge | F02C 7/36 |
| 10,570,824 | B2 * | 2/2020 | Schwarz | F16H 57/0482 |
| 10,577,974 | B2 | 3/2020 | Valva et al. | |
| 10,634,053 | B2 * | 4/2020 | Schwarz | F16H 57/0471 |
| 10,711,877 | B2 | 7/2020 | Fisher et al. | |
| 10,801,413 | B2 * | 10/2020 | Roberge | F02C 6/14 |
| 10,851,689 | B2 * | 12/2020 | Engel | F01M 11/065 |
| 11,073,041 | B2 * | 7/2021 | Uhkoetter | F01M 1/02 |
| 11,085,521 | B2 * | 8/2021 | Edwards | F16N 7/16 |
| 11,092,037 | B2 | 8/2021 | Valva et al. | |
| 11,313,454 | B2 * | 4/2022 | Davies | F02C 7/36 |
| 2011/0168494 | A1 * | 7/2011 | Subramaniam | F03D 80/70 184/6.12 |
| 2012/0192974 | A1 * | 8/2012 | Szolomayer | B01D 45/16 137/571 |
| 2019/0376416 | A1 * | 12/2019 | Mastro | F02C 7/36 |

FOREIGN PATENT DOCUMENTS

| | | | |
|---|---|---|---|
| EP | 3636884 A1 | 4/2020 | |
| EP | 3730816 B1 * | 10/2022 | F01D 25/20 |
| EP | 4067145 A1 | 10/2022 | |

* cited by examiner

GEARBOX ASSEMBLY LUBRICATION SYSTEM FOR A TURBINE ENGINE

CROSS-REFERENCE TO RELATED APPLICATIONS

This application claims priority to U.S. Provisional Application No. 63/509,445, filed Jun. 21, 2023, the entire contents of which is hereby incorporated by reference.

TECHNICAL FIELD

The present disclosure relates generally to lubrication systems, for example, for gear assemblies in turbine engines.

BACKGROUND

A turbine engine generally includes a fan and a core section arranged in flow communication with one another. A gearbox assembly transfers torque and power from one rotating component to another rotating component (e.g., from the core section to the fan, or to provide power to auxiliary components of the turbine engine or portions of an aircraft). A lubrication system provides lubricant to one or more components of the gearbox assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 3A shows the gearbox assembly in a first rotational position.

FIG. 3B shows the gearbox assembly in a second rotational position.

FIG. 3C shows the gearbox assembly in a third rotational position.

FIG. 4 shows the gearbox assembly in the second rotational position.

DETAILED DESCRIPTION

Figure 1:
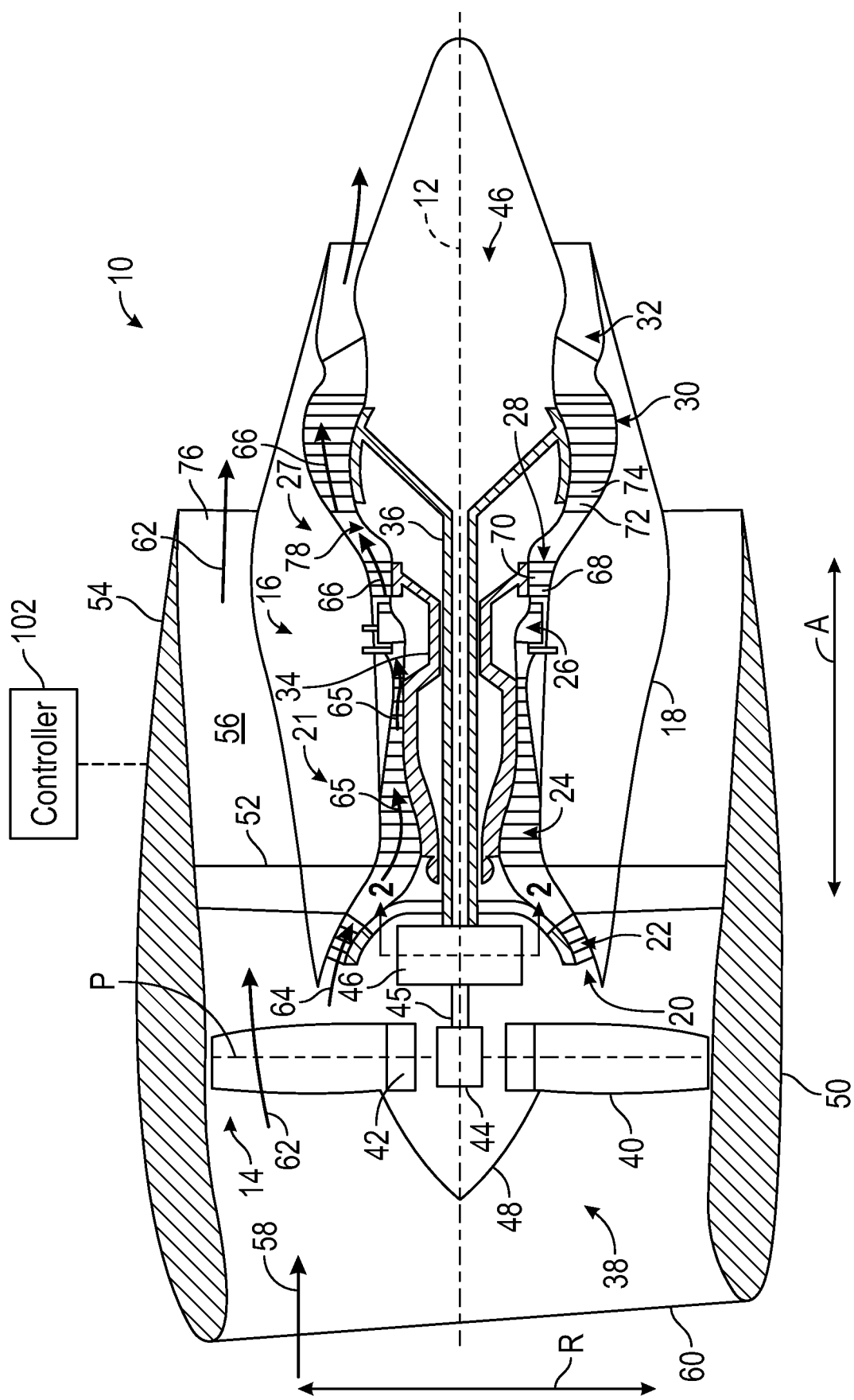
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shutdown, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, a two, a four, a ten, a fifteen, or a twenty percent margin in either individual values, range(s) of values and/or endpoints defining range(s) of values.

The present disclosure provides for a lubrication system for a gearbox assembly of a turbine engine. The gearbox assembly is utilized to transfer power and torque from a turbine shaft, such as a low-pressure shaft, to the fan of the turbine engine. The gearbox assembly is an epicyclic gear assembly and includes a gear assembly including a sun gear, one or more planet gears secured by a planet carrier, and a ring gear. For example, the gear assembly can be configured in a star arrangement in which the ring gear rotates, and the planet carrier is held stationary. In some embodiments, the gear assembly is configured in a planetary arrangement in which the ring gear is held stationary, and the planet carrier rotates such that the plurality of planet gears rotates about a longitudinal centerline axis of the turbine engine. In operation, the gearbox assembly transfers the torque transmitted from the turbine shaft operating at a first speed to a fan shaft rotating at a second, lower speed. Such a gearbox assembly can be utilized in turbine engines for propelling aircraft, such as commercial aircraft, or the like. The gearbox assembly can also be utilized as an accessory gearbox to transmit torque and power to one or more accessories of the turbine engine or of the aircraft. While an epicyclic gearbox assembly is detailed herein, the present disclosure can be utilized in any type of gearbox, including, for example, a multiple stage gearbox, a propeller gearbox, a compound gearbox, or the like.

The gearbox assembly includes one or more bearings that allow rotation of the plurality of planet gears about the one or more bearings. In one embodiment, one or more of the bearings are journal bearings. The one or more bearings can include any type of bearings, such as, for example, roller bearings, or the like. The lubrication system supplies lubricant (e.g., oil) to the gearbox assembly for lubricating various components of the gearbox assembly, such as, for example, the gears and the bearings. The lubrication system includes a lubricant pump that pumps the lubricant from a tank and through a lubricant supply line to supply the lubricant to the bearings and the gears.

The bearings, especially journal bearings, are hydrodynamic bearings that typically require a steady supply of lubricant during all operational phases of the turbine engine and during windmilling with the turbine engine off in order to properly lubricate the bearings to prevent damage due to sliding contact for hydrodynamic journal bearings or even for the generic gear mesh interface. The gearbox assembly may experience long duration, continued rotation following a shutdown of the turbine engine, such as that occurring during windmilling. In such instances, the gears and the bearings can be affected by not receiving enough lubricant for lubricating the gears and the bearings. For example, during windmilling, the rotational speed of the shafts may be too low to power the lubricant pump to pump the lubricant to the gearbox assembly. In some instances, e.g., during operation of the turbine engine (e.g., in-flight), the lubrication system may lose pressure (e.g., due to a failure of the lubricant pump or other components of the lubrication system), such that the lubrication system is unable to provide the lubricant to the gearbox assembly via the lubricant pump and the lubricant supply line.

The criticality of the lubricant interruptions increases when the bearings are journal bearings since the absence of lubricant at the journal bearings can lead to a journal bearing failure and subsequent gearbox failure which may cause the low-speed shaft to lock up permanently. Such a failure of the journal bearings is referred to as a journal bearing seizure and occurs when there is contact between the planet pin and the bore of the planet gear, thereby causing a significant increase of wear and friction which leads to bearing failure. If contact occurs between the journal bearing and the pin during high-power operation, the two components can become welded together due to the high temperature from the friction, resulting in over-torque of the gears.

Some gearbox assemblies include an auxiliary lubrication system to supply lubricant to the journal bearings and to the gears to prevent damage to the gearbox assembly due to inadequate lubricant supply during windmilling. Such auxiliary lubrication systems, however, typically require an additional pump (e.g., a fan-driven pump or an electrical pump) that adds weight to the turbine engine. The lubricant pump requires added complexity to provide the lubricant during high speeds, such as during operation of the turbine engine, and during low speeds, such as during windmilling (e.g., in-flight or on the ground). Further, the lubricant pump requires added complexity to provide the lubricant while the fan windmills in either direction (e.g., the fan rotates left or right).

Accordingly, the present disclosure provides lubrication during windmilling, or during other loss of pressure conditions (e.g., loss of pressure in the lubrication system, loss of pressure in the fuel system, loss of pressure in the hydraulic system, etc.), by creating a large reservoir of lubricant in the bottom of the sump of the gearbox assembly after the loss of pressure (e.g., during shutdown or during failure of one or more components of the lubrication system, the fuel system, the hydraulic system, etc.). The level of lubricant in the large reservoir is greater than the level of lubricant in the sump during normal operating conditions of the turbine engine. During normal operating conditions of the turbine engine, the lubricant is drained from the large reservoir back to the level of lubricant in the sump to avoid excess lubricant and to prevent excess heat from accumulating due to excess lubricant and overworking a thermal management system (TMS) of the turbine engine.

The present disclosure provides for a turbine engine having a fan and a fan shaft driving the fan. The lubrication system includes a scavenge gutter for draining the lubricant that sprays off of the gears of the gear assembly. The lubrication system includes a large, secondary reservoir, also referred to as a scavenge reservoir. The lubricant level in the secondary reservoir is variable between the level of the lubricant in the sump and a maximum level. The lubrication system includes a sump line with a plurality of drain ports for draining the lubricant from the sump and the secondary reservoir to the tank. The sump line can include one or more drain valves to open and to close the plurality of drain ports. The plurality of drain ports can include drain ports at various clocking positions of the gearbox assembly to allow the lubricant to drain from the sump and the secondary reservoir even when the aircraft turns, banks, or rolls left or right. The plurality of drain ports includes a secondary drain port positioned at the maximum lubricant level of the secondary reservoir to allow the lubricant to drain to ensure the lubricant does not fill the secondary reservoir beyond the maximum lubricant level.

At shutdown or other engine off scenarios, the one or more drain valves close such that the lubricant fills the secondary reservoir above the lubricant level of the sump. The one or more drain valves can be passively or actively engaged (e.g., open) by a physical existence or a sensed existence of lubricant pressure, fuel pressure, or hydraulic pressure due to the turbine engine reaching a predetermined operating speed (e.g., a predetermined speed of the turbo-engine). The drain valve can be a solenoid valve that is electrically energized when the engine controller is powered on, for example, at a predetermined operating speed of the turbine engine. During the windmilling (e.g., at shutdown of the turbine engine), the gearbox assembly is substantially self-lubricating due to the gears or other features of the gear assembly being immersed in the lubricant within the secondary reservoir. For example, one or more of the planet gears contact the lubricant in the secondary reservoir to pick up the lubricant and rotation of the planet gears causes the lubricant to flow to the various gears and to the bearings. In some embodiments, the lubrication system includes one or more scuppers to supply the lubricant from the secondary reservoir to the gears and the bearings. Accordingly, the present disclosure provides for supplying lubricant to the gears or the bearings during shutdown of the turbine engine or other loss of pressure scenarios.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison, as detailed further below. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and/or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 102 is in communication with the turbine engine 10 for controlling aspects of the turbine engine 10.

For example, the controller 102 is in two-way communication with the turbine engine 10 for receiving signals from various sensors and control systems of the turbine engine 10 and for controlling components of the turbine engine 10, as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
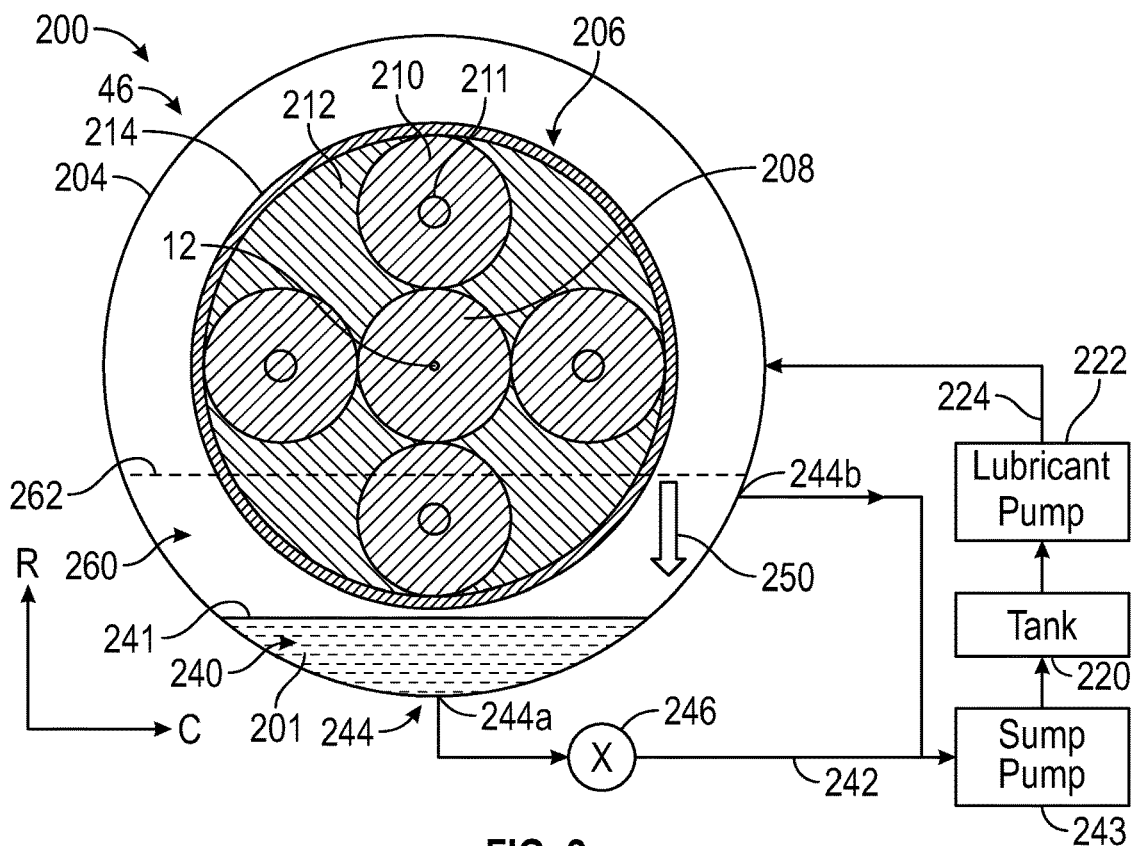
FIG. 2 is a schematic axial end cross-sectional view of a lubrication system for a gearbox assembly, taken at section 2-2 in FIG. 1, according to the present disclosure

FIG. 2 is a schematic axial end cross-sectional view of a lubrication system 200 for the gearbox assembly 46, taken at section 2-2 in FIG. 1, according to the present disclosure. The gearbox assembly 46 includes a housing 204 (e.g., shown schematically in FIG. 2) and a gear assembly 206.

The gear assembly 206 includes one or more gears including a first gear 208, one or more second gears 210 secured by a planet carrier 212, and a third gear 214 (collectively referred to as the gears of the gear assembly 206). In FIG. 2, the first gear 208 is a sun gear, the one or more second gears 210 are planet gears, and the third gear 214 is a ring gear. The gear assembly 206 can be an epicyclic gear assembly. When the gear assembly 206 is an epicyclic gear assembly, the one or more second gears 210 include a plurality of second gears 210 (e.g., two or more second gears 210). For example, the one or more second gears 210 include four second gears 210 in FIG. 2, but can include any number of second gears 210.

In the epicyclic gear assembly, the gear assembly 206 can be in a star arrangement or a rotating ring gear type gear assembly (e.g., the third gear 214 is rotating and the planet carrier 212 is fixed and stationary). In such an arrangement, the fan 38 (FIG. 1) is driven by the third gear 214. For example, the third gear 214 is coupled to the fan shaft 45 (FIG. 1) such that rotation of the third gear 214 causes the fan shaft 45, and, thus, the fan 38, to rotate. In this way, the third gear 214 is an output of the gear assembly 206. However, other suitable types of gear assemblies may be employed. In one non-limiting embodiment, the gear assembly 206 is a planetary arrangement, in which the third gear 214 is held fixed, with the planet carrier 212 allowed to rotate. In such an arrangement, the fan 38 is driven by the planet carrier 212. For example, the planet carrier 212 is coupled to the fan shaft 45 (FIG. 1) such that rotation of the planet carrier 212 causes the fan shaft 45, and, thus, the fan 38, to rotate. In this way, the one or more second gears 210 (e.g., the planet carrier 212) are the output of the gear assembly 206. In another non-limiting embodiment, the gear assembly 206 may be a differential gear assembly in which the third gear 214 and the planet carrier 212 are both allowed to rotate. While an epicyclic gear assembly is detailed herein, the gear assembly can include any type of gear assembly including, for example, a compound gear assembly, a multiple stage gear assembly, a gear assembly for driving a propeller, a gear assembly for driving accessories of the turbine engine 10 (FIG. 1) or accessories of the aircraft, or the like.

The one or more second gears 210 each includes one or more bearings 211 disposed therein. The one or more bearings 211 enable the one or more second gears 210 to rotate about the one or more bearings 211 such that that one or more second gears 210. The one or more bearings 211 can include any type of bearing for a gear, such as, for example, journal bearings, roller bearings, or the like.

The first gear 208 is coupled to an input shaft of the turbine engine 10 (FIG. 1). For example, the first gear 208 is coupled to the LP shaft 36 (FIG. 1) such that rotation of the LP shaft 36 causes the first gear 208 to rotate. Radially outward of the first gear 208, and intermeshing therewith, is the one or more second gears 210 that are coupled together and supported by the planet carrier 212 (shown schematically). The planet carrier 212 supports and constrains the one or more second gears 210 such that the each of the one or more second gears 210 is enabled to rotate about a corresponding axis of each second gear 210 without rotating about the periphery of the first gear 208. Radially outwardly of the one or more second gears 210, and intermeshing therewith, is the third gear 214, which is an annular ring gear. The third gear 214 is coupled via an output shaft to the fan 38 (FIG. 1) and rotates to drive rotation of the fan 38 (FIG. 1) about the longitudinal centerline axis 12. For example, the fan shaft 45 (FIG. 1) is coupled to the third gear 214.

The gearbox assembly 46 may be viewed with respect to a "clock" orientation having a twelve o'clock position, a three o'clock position, a six o'clock position, and a nine o'clock position, in the orientation of the gearbox assembly 46 in FIG. 2. Although not provided with reference numerals, the clock orientation is understood to include all clock positions therebetween.

The lubrication system 200 includes a tank 220 that stores lubricant 201 therein, a lubricant pump 222, and a lubricant supply line 224. Preferably, the lubricant 201 is oil. The lubricant 201 can be any type of lubricant for lubricating the gears (e.g., the first gear 208, the one or more second gears 210, or the third gear 214) or the one or more bearings 211 of the gear assembly 206. The lubricant pump 222 is in fluid communication with the tank 220 and the lubricant supply line 224. The lubricant supply line 224 is in fluid communication with the gearbox assembly 46. The lubricant pump 222 pumps the lubricant 201 from the tank 220 to the gearbox assembly 46 through the lubricant supply line 224 for supplying the lubricant 201 to the gear assembly 206 (e.g., to the gears of the gear assembly 206 or one or more bearings of the gear assembly 206), as detailed further below. In some embodiments, the lubrication system 200 supplies the lubricant 201 from the tank 220 to the gearbox assembly 46 without a pump, for example, by gravity or by centrifugal force due to rotation of the planet carrier 212 in the planetary arrangement of the gear assembly 206.

The lubrication system 200 includes a sump 240 within the turbine engine 10 (FIG. 1) and in fluid communication with the gearbox assembly 46. In one embodiment, the sump 240 is located within the gearbox assembly 46 (e.g., within the housing 204). The sump 240 is a reservoir that collects and stores the lubricant 201 that drains from the gear assembly 206 or from the one or more bearings 211 of the gear assembly 206. The sump 240 provides a primary reservoir that stores the lubricant 201 at a first lubricant level 241. The lubrication system 200 also includes a secondary reservoir 260 that stores the lubricant at a second lubricant level 262, as detailed further below. The second lubricant level 262 is greater than the first lubricant level 241. The sump 240 includes a sump line 242 for draining the lubricant 201 from the sump 240. The sump line 242, also referred to as a scavenge line, is in fluid communication with the sump 240 and with the tank 220. In this way, the lubricant 201 drains from the sump 240 and the sump line 242 operably directs the lubricant 201 to the tank 220. In some embodiments, the lubrication system 200 includes a sump pump 243 in fluid communication with the sump 240 and the sump line 242. The sump pump 243 pumps the lubricant 201 and pumps air within the sump 240 or the sump line 242 that has leaked into the sump 240 during operation of the turbine engine 10 (FIG. 1). The sump pump 243 is a suction pump that generates suction to pull the lubricant 201 and/or the air through the sump line 242 and towards the tank 220.

The sump line 242 includes a plurality of drain ports 244 that is in fluid communication with the sump 240 or the secondary reservoir 260. The plurality of drain ports 244 enables the lubricant 201 to drain from the gearbox assembly 46 into the sump line 242. The plurality of drain ports 244 includes a first drain port 244a and a second drain port 244b. The first drain port 244a is positioned at a bottom of the gearbox assembly 46 (e.g., at a bottom of the sump 240) such that the lubricant 201 can drain from the sump 240 via gravity. For example, the first drain port 244a is positioned at approximately the six o'clock position of the gearbox assembly 46. The second drain port 244b is positioned radially above the first drain port 244a and is in fluid communication with the secondary reservoir 260. The second drain port 244b is positioned approximately at the second lubricant level 262 such that the lubricant 201 drains through the second drain port 244b at the second lubricant level 262, as detailed further below. For example, the second drain port 244b is positioned between the three o'clock position and a four o'clock position of the gearbox assembly 46.

The sump line 242 also includes one or more drain valves 246 within the sump line 242. The one or more drain valves 246 are in communication with the controller 102 (FIG. 1). The controller 102 controls the one or more drain valves 246 to open and to close the one or more drain valves 246. When the one or more drain valves 246 are open, the lubricant 201 drains from the gearbox assembly 46 through the sump line 242 and into the tank 220, as detailed further below. When the one or more drain valves 246 are closed, the one or more drain valves 246 prevent the lubricant 201 from draining from the gearbox assembly 46, as detailed further below. The one or more drain valves 246 can include any type of valve that opens to allow the lubricant 201 to flow through the sump line 242 and that closes to prevent the lubricant 201 from flowing through the sump line 242. In some embodiments, the one or more drain valves 246 are in fluid communication with the lubrication system 200 and are controlled to be opened or to be closed based on a pressure signal of the lubricant 201 in the lubrication system 200 (e.g., in the lubricant supply line 224).

In operation, the LP shaft 36 (FIG. 1) rotates, as detailed above, and causes the first gear 208 to rotate. The first gear 208, being intermeshed with the one or more second gears 210, causes the one or more second gears 210 to rotate about their corresponding axis of rotation. The one or more second gears 210 rotate with respect to the one or more bearings 211 within the planet carrier 212. When the gear assembly 206 is the star arrangement, the one or more second gears 210, being intermeshed with the third gear 214, cause the third gear 214 to rotate about the longitudinal centerline axis 12. In such embodiments, the planet carrier 212 remains stationary such that the one or more second gears 210 do not rotate about the longitudinal centerline axis 12. When the gear assembly 206 is the planetary arrangement, the third gear 214 is stationary in and the planet carrier 212, and the one or more second gears 210, rotate about the longitudinal centerline axis 12. When the gear assembly 206 is the differential gear assembly, both the planet carrier 212 (e.g., the one or more second gears 210) and the third gear 214 rotate about the longitudinal centerline axis 12.

As the gears of the gear assembly 206 rotate, the lubrication system 200 supplies the lubricant 201 to the gears and/or to the one or more bearings 211 to lubricate the gears and/or the one or more bearings 211. During operation of the turbine engine 10 (FIG. 1), the lubricant pump 222 pumps the lubricant 201 from the tank 220 and into the gearbox assembly 46 through the lubricant supply line 224. The lubrication system 200 supplies the lubricant 201 to the gears of the gear assembly 206 and/or to the one or more bearings 211. For example, the lubricant supply line 224 is in fluid communication with the gears of the gear assembly 206 and/or with the one or more bearings 211.

The lubricant 201 drains from the gear assembly 206 and into the sump 240 (as indicated by arrow 250). During operation of the turbine engine 10, the lubricant 201 fills the sump 240 to the first lubricant level 241. The first lubricant level 241 is below the gear assembly 206 such that the lubricant 201 in the sump 240 is prevented from contacting the gears of the gear assembly 206 while the lubricant 201 is stored in the sump 240. The lubricant 201 in the sump 240 is drained from the sump 240 through the sump line 242. For example, the one or more drain valves 246 are opened during operation of the turbine engine 10, and the lubricant pump 222 (or the sump pump 243 or a scavenge pump) pumps the lubricant 201 from the sump 240 through the sump line 242 and re-circulates the lubricant 201 through the lubrication system 200 (e.g., through the lubricant supply line 224) and the gearbox assembly 46. In this way, the lubricant 201 can be re-used to lubricate the gears of the gear assembly 206 or the one or more bearings 211 of the gear assembly 206. The lubrication system 200 can also supply the lubricant 201 to other components of the gearbox assembly 46, or to other components of the turbine engine 10 (FIG. 1).

In some instances, the lubrication system 200 may be unable to provide the lubricant 201 to the gearbox assembly 46. For example, the lubrication system 200 may be unable to pressurize the lubricant 201 to supply the lubricant 201 to the gearbox assembly 46 during windmilling while the turbine engine 10 is shut down and/or during a failure of the turbine engine 10 or the lubrication system 200 (e.g., the lubricant pump 222 fails) while in-flight. In such instances, the windmilling may cause the shafts of the turbine engine 10 to rotate, thereby causing the gear assembly 206 to rotate. The gears of the gear assembly 206 and/or the one or more bearings 211 can become damaged if there is not enough lubricant 201 supplied to the gears and/or to the one or more bearings 211.

Accordingly, during such instances, one or more the drain valves 246 close such that the lubricant 201 drains from the gear assembly 206 (as indicated by the arrow 250) and fills the secondary reservoir 260 to the second lubricant level 262. The second drain port 244b drains the lubricant 201 such that the second drain port 244b ensures that the lubricant 201 does not fill the secondary reservoir 260 beyond the second lubricant level 262. The second lubricant level 262 is positioned such that the lubricant 201 in the secondary reservoir 260 contacts at least a portion of gears of the gear assembly 206. For example, the lubricant 201 in the secondary reservoir 260 contacts at least a portion of the one or more second gears 210. In this way, the gears of the gear assembly 206 collect the lubricant 201 in the secondary reservoir 260 as the gears of the gear assembly 206 rotate through the secondary reservoir 260. For example, as the one or more second gears 210 or the third gear 214 rotates through the lubricant 201 within the secondary reservoir 260, at least a portion of the lubricant 201 collects on the one or more second gears 210 or the third gear 214. The rotation of the gears of the gear assembly 206 distributes the lubricant 201 to the gears of the gear assembly 206 and/or to the one or more bearings 211. In this way, the lubrication system 200 supplies the lubricant 201 to the gears of the gear assembly 206 and/or to the one or more bearings 211 even if the lubricant supply line 224 loses pressure and the lubrication system 200 is unable to supply the lubricant 201 through the lubricant supply line 224.

The second lubricant level 262 can be variable. For example, the secondary reservoir 260 can be filled with lubricant 201 to any level between the first lubricant level 241 and the second lubricant level 262 as long as the secondary reservoir 260 is filled with enough lubricant 201 such that at least one of the gears of the gear assembly 206 contact the lubricant 201 within the secondary reservoir 260. The one or more drain valves 246 open and close to vary the level of the second lubricant level 262. For example, the one or more drain valves 246 close to fill the secondary reservoir 260 with the lubricant 201, and can open to allow the lubricant 201 to drain through the first drain port 244a when the lubricant 201 is at a desired level within the secondary reservoir 260. In some embodiments, the lubrication system 200 includes a second drain valve in fluid communication with the second drain port 244b such that the second drain port 244b can be opened and closed separately from, or in combination with, the first drain port 244a.

In some embodiments, the one or more drain valves 246 are controlled by at least one of a pressure of the lubricant 201, a pressure of fuel in the turbine engine 10, or a pressure of hydraulics of the turbine engine 10 (e.g., hydraulics for controlling control surfaces of the aircraft). For example, the one or more drain valves 246 open when the at least one of the pressure of the lubricant 201, the pressure of the fuel in the turbine engine 10, or the pressure of the hydraulics of the turbine engine 10 increases above a predetermined pressure threshold. The predetermined pressure threshold is determined based on a predetermined operating speed of the turbine engine 10 (e.g., a speed of the turbo-engine 16 and/or a speed of the fan 38). The one or more drain valves 246 close when the at least one of the pressure of the lubricant 201, the pressure of the fuel in the turbine engine 10, or the pressure of the hydraulics of the turbine engine 10 decreases below the predetermined pressure threshold. The at least one of the pressure of the lubricant 201, the pressure of the fuel in the turbine engine 10, or the pressure of the hydraulics of the turbine engine 10 is based on a speed of the turbo-engine 16. For example, when a speed of the turbo-engine 16 (e.g., the HP shaft 34 or the LP shaft 36 of FIG. 1) is greater than a speed threshold, the at least one of the pressure of the lubricant 201, the pressure of the fuel in the turbine engine 10, or the pressure of the hydraulics of the turbine engine 10 is greater than the predetermined pressure threshold. Similarly, when the speed of the turbo-engine 16 is less than the speed threshold, the at least one of the pressure of the lubricant 201, the pressure of the fuel in the turbine engine 10, or the pressure of the hydraulics of the turbine engine 10 is less than the predetermined pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to open the one or more drain valves 246.

In some embodiments, the one or more drain valves 246 are controlled by the controller 102 (FIG. 1). For example, the controller 102 controls the one or more drain valves 246 to open and to close the one or more drain valves 246. In such embodiments, the one or more drain valves 246 are electrically energized valves, such as, for example, a solenoid valve. In some embodiments, the one or more drain valves 246 open when the controller 102 turns on, and the one or more drain valves 246 close when the controller 102 turns off (e.g., during a shutdown of the turbine engine 10). The controller 102 turns on when the speed of the turbo-engine 16 is greater than the speed threshold. The turbine engine 10 provides power to the controller 102 to turn the controller 102 on when the speed of the turbo-engine 16 is greater than the speed threshold. The controller 102 turns off when the speed of the turbo-engine 16 is less than the speed threshold.

Figure 3A:
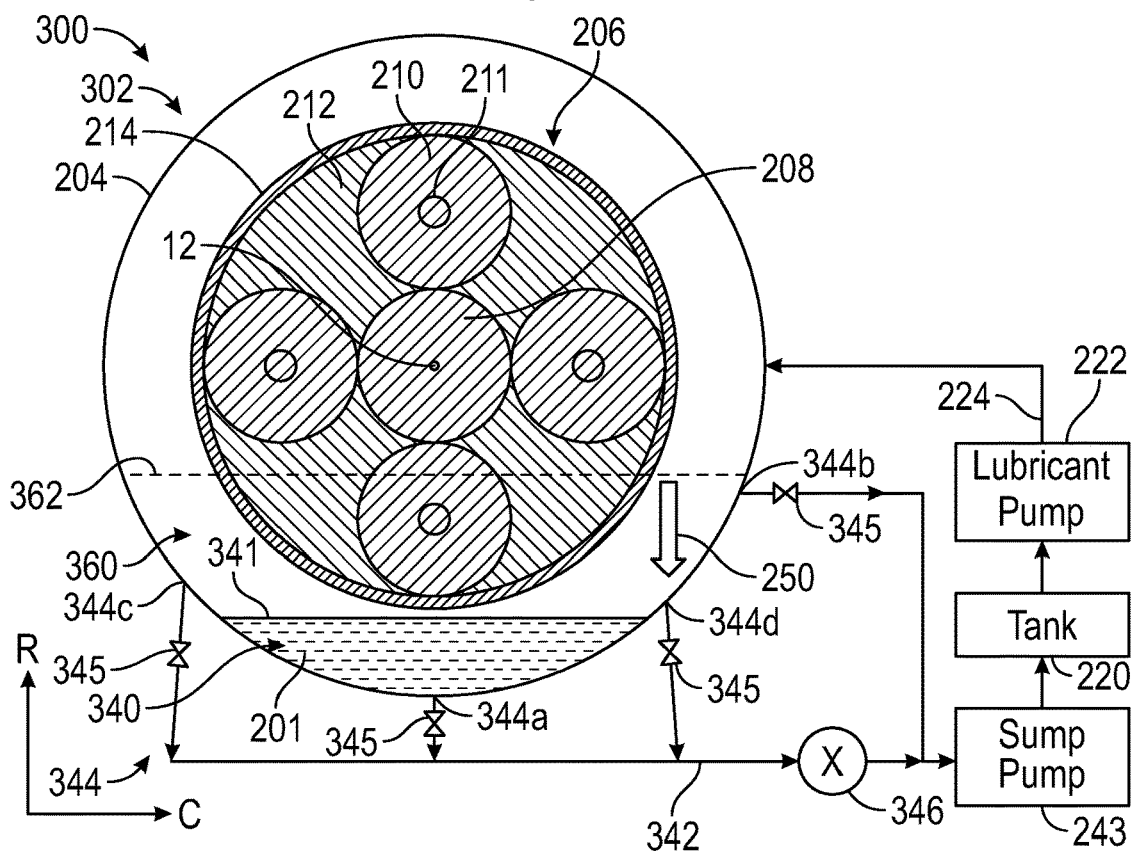
FIG. 3A is a schematic axial end cross-sectional view of a lubrication system for a gearbox assembly, according to another embodiment.
Figure 3B:
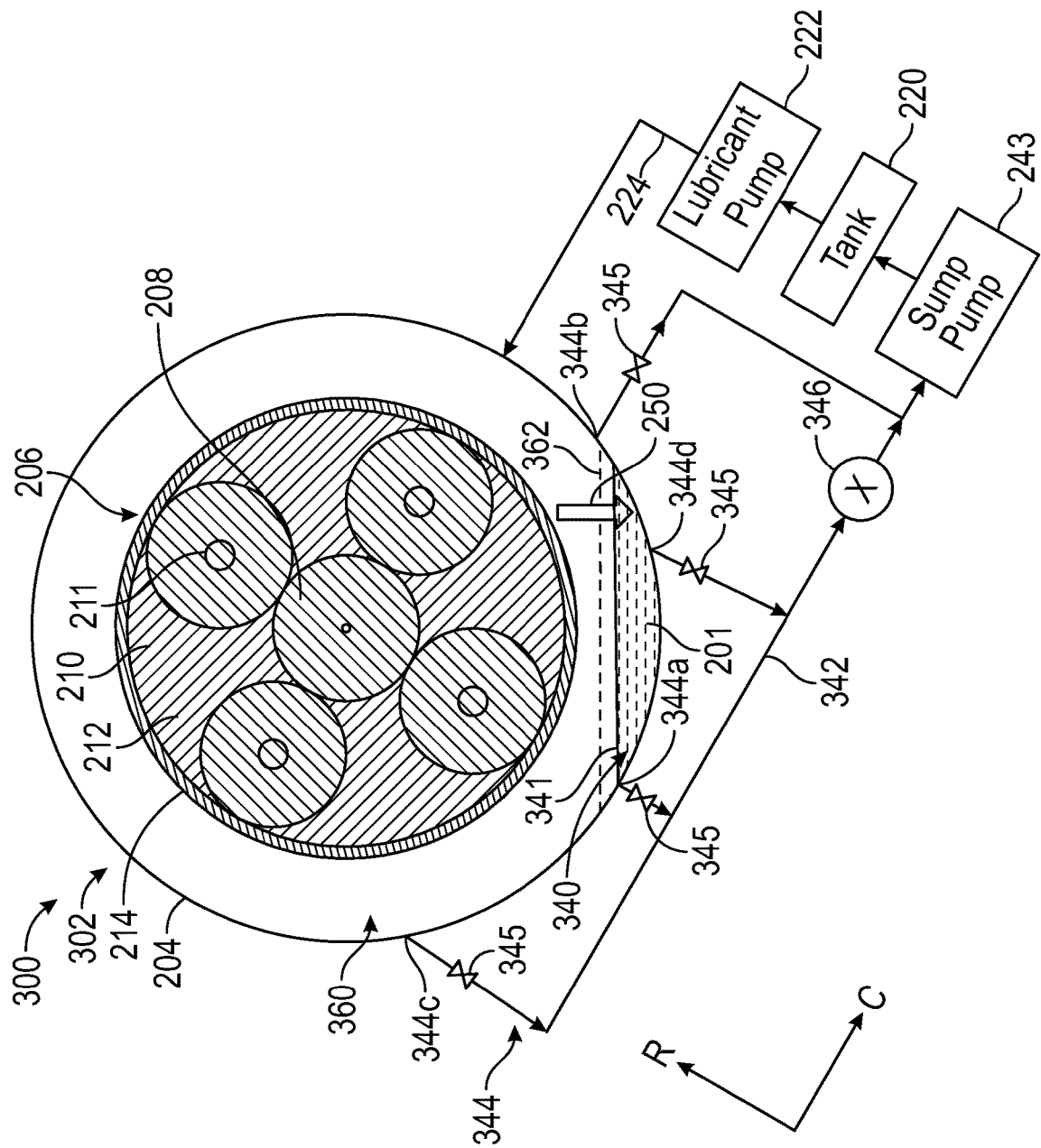
FIG. 3B is a schematic axial end cross-sectional view of the lubrication system for the gearbox assembly of FIG. 3A, according to another embodiment.
Figure 3C:
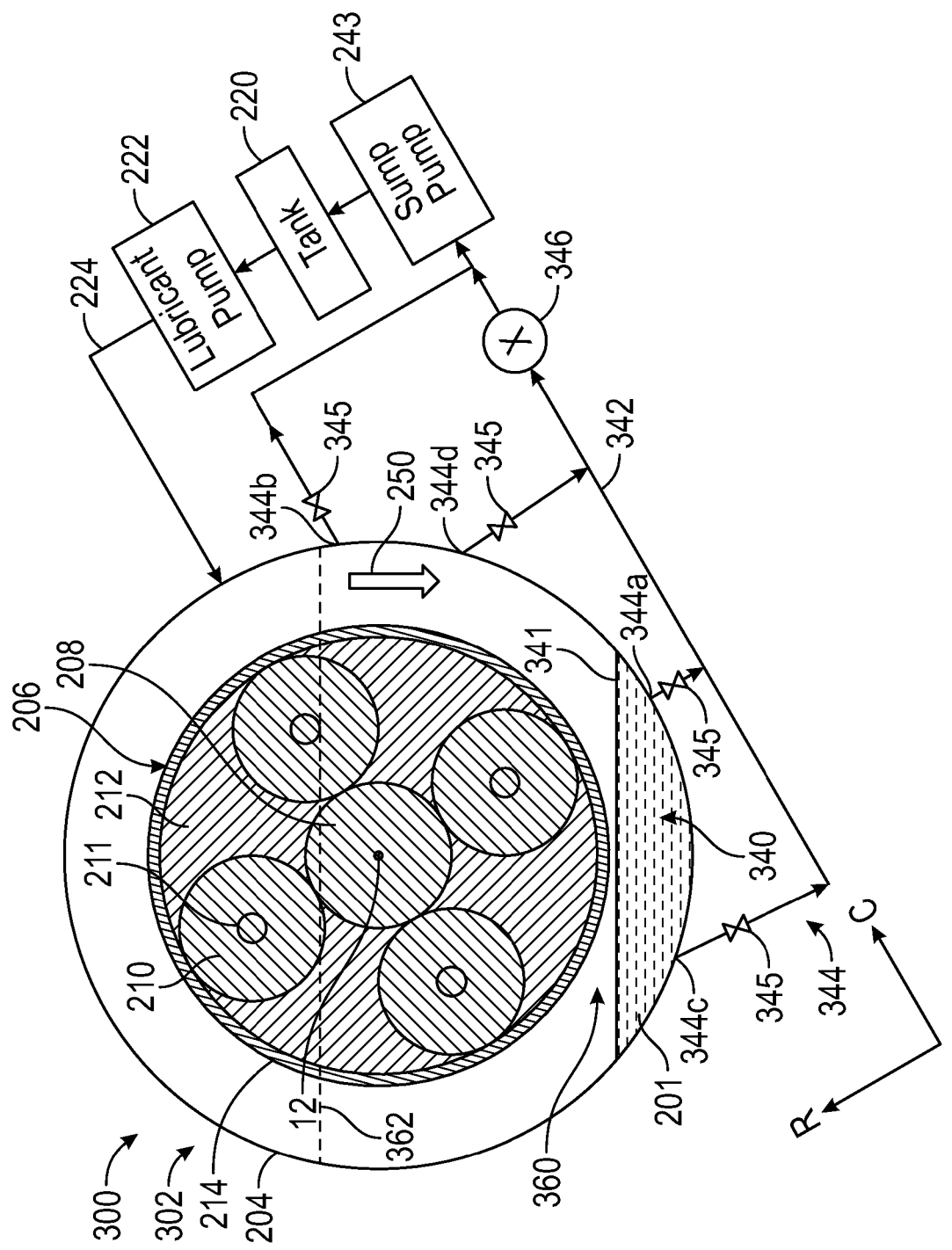
FIG. 3C is a schematic axial end cross-sectional view of the lubrication system for the gearbox assembly of FIG. 3A, according to another embodiment.

FIGS. 3A to 3C are schematic axial end cross-sectional views of a lubrication system 300 for a gearbox assembly 302, according to another embodiment. FIG. 3A shows the gearbox assembly 302 in a first rotational position. FIG. 3B shows the gearbox assembly 302 in a second rotational position. FIG. 3C shows the gearbox assembly 302 in a third rotational position. The lubrication system 300 and the gearbox assembly 302 include many of the same components or similar components as the lubrication system 200 and the gearbox assembly 46 of FIG. 2, respectively.

The lubrication system 300 includes a sump 340 having a first lubricant level 341, a sump line 342, a plurality of drain ports 344, one or more drain valves 346, and a secondary reservoir 360 having a second lubricant level 362. The sump 340 and the secondary reservoir 360 are substantially similar to the sump 240 and the secondary reservoir 260 of FIG. 2, respectively. The plurality of drain ports 344 includes a first drain port 344a, a second drain port 344b, a third drain port 344c, and a fourth drain port 344d. The first drain port 344a and the second drain port 344b are substantially similar to the first drain port 244a and the second drain port 244b of FIG. 2. For example, the first drain port 344a is positioned at the bottom of the gearbox assembly 302 (e.g., at a bottom of the sump 340) and the second drain port 344b is positioned radially above the first drain port 344a. For example, the second drain port 344b is positioned approximately at the second lubricant level 362 such that the lubricant 201 drains through the second drain port 344b at the second lubricant level 362. In this way, the first drain port 344a is positioned approximately at the six o'clock position of the gearbox assembly 302, and the second drain port 344b is positioned between the three o'clock position and a four o'clock position of the gearbox assembly 302.

The third drain port 344c and the fourth drain port 344d help to drain the lubricant 201 from the sump 340 and/or from the secondary reservoir 360 when the gearbox assembly 302 changes rotational position. The third drain port 344c and the fourth drain port 344d are positioned radially between the first drain port 344a and the second drain port 344b. The third drain port 344c is positioned on a first circumferential side of the first drain port 344a and the fourth drain port 344d is positioned on a second circumferential side of the first drain port 344a. For example, the third drain port 344c is positioned between the six o'clock position and the nine o'clock position of the gearbox assembly 302. The fourth drain port 344d is positioned between the first drain port 344a and the second drain port 344b. For example, the fourth drain port 344d is positioned between the six o'clock position and the three o'clock position of the gearbox assembly 302.

The lubrication system 300 and the gearbox assembly 302 operate substantially similarly as do the lubrication system 200 and the gearbox assembly 46 of FIG. 2, respectively. The third drain port 344c and the fourth drain port 344d allow the lubricant 201 to drain from the sump 340 and/or from the secondary reservoir 360 even if the gearbox assembly 302 changes rotational position. For example, when the turbine engine (e.g., the turbine engine 10 of FIG. 1) powers an aircraft, the aircraft turns, banks, or rolls such that the turbine engine, and, thus, the gearbox assembly 302 changes the rotational position. When the aircraft is operating at level flight (e.g., the aircraft is not turning, not banking, or not rolling), the gearbox assembly 302 is in the first rotational position shown in FIG. 3A such that the six o'clock position of the gearbox assembly 302 is substantially at the bottom of the gearbox assembly 302. In such an orientation, the lubricant 201 drains from the sump 340 and/or from the secondary reservoir 360 through the first drain port 344a when the one or more drain valves 346 are open.

When the aircraft turns, banks, or rolls left, the gearbox assembly 302 is in the second rotational position shown in FIG. 3B such that the six o'clock position of the gearbox assembly 302 rotates left. In such an orientation, the fourth drain port 344d is positioned at approximately the lowest point of the gearbox assembly 302 such that the lubricant 201 drains from the sump 340 and/or from the secondary reservoir 360 through the fourth drain port 344d when the one or more drain valves 346 are open. The lubricant 201 can also drain through the first drain port 344a in such a configuration if a level of the lubricant 201 in the sump 340 and/or in the secondary reservoir 360 is at the first drain port 344a. The lubricant 201 can also drain through the second drain port 344b in such a configuration if a level of the lubricant 201 in the sump 340 and/or in the secondary reservoir 360 is at the fourth drain port 344d.

When the aircraft turns, banks, or rolls right, the gearbox assembly 302 is in the third rotational position shown in FIG. 3C such that the six o'clock position of the gearbox assembly 302 rotates right. In such an orientation, the third drain port 344c is positioned at approximately the lowest point of the gearbox assembly 302 such that the lubricant 201 drains from the sump 340 and/or from the secondary reservoir 360 through the third drain port 344c when the one or more drain valves 346 are open. The lubricant 201 can also drain through the first drain port 344a in such a configuration if a level of the lubricant 201 in the sump 340 and/or in the secondary reservoir 360 is at the first drain port 344a.

Accordingly, the lubricant 201 can drain through the sump line 342 regardless of the rotational position of the gearbox assembly 302. The plurality of drain ports 344 can include any number of drain ports 344 positioned between the second lubricant level 362 and the first drain port 344a for allowing the lubricant 201 to drain from the sump 340 and/or from the secondary reservoir 360 in any rotational position of the gearbox assembly 302. In some embodiments, each drain port 344 includes a drain valve 345 in fluid communication with the respective drain port 344. In this way, the drain valve 345 of each drain port 344 can be opened to allow the lubricant 201 to drain through the respective drain port 344 and can be closed to prevent the lubricant 201 from draining through the respective drain port 344.

Figure 4:
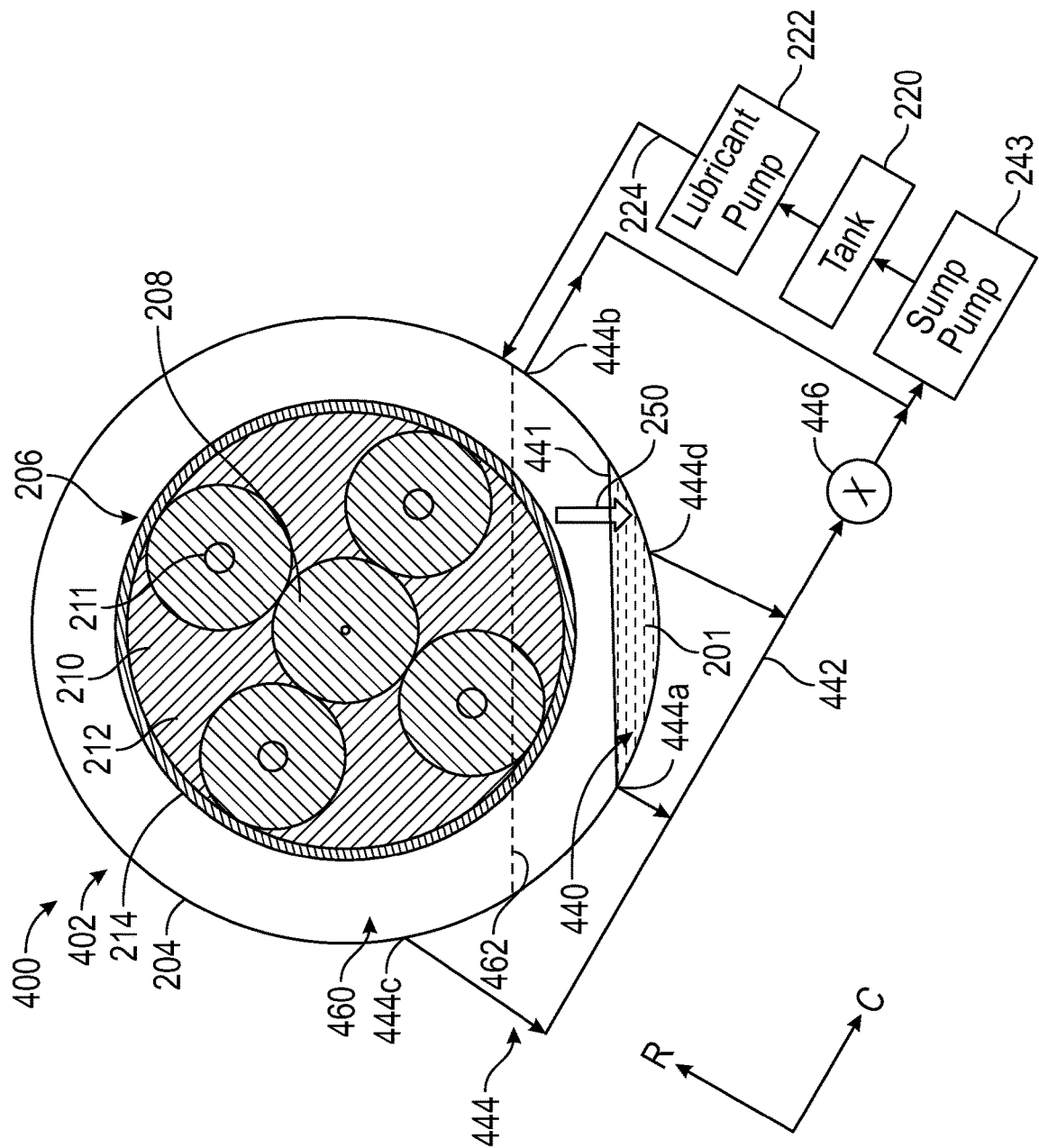
FIG. 4 is a schematic axial end cross-sectional view of a lubrication system for a gearbox assembly, according to another embodiment.

FIG. 4 is a schematic axial end cross-sectional view of a lubrication system 400 for a gearbox assembly 402, according to another embodiment. FIG. 4 shows the gearbox assembly 402 in the second rotational position. The lubrication system 400 and the gearbox assembly 402 include many of the same components or similar components as the lubrication system 300 and the gearbox assembly 302 of FIGS. 3A to 3C, respectively.

The lubrication system 400 includes a sump 340 having a first lubricant level 441, a sump line 442, a plurality of drain ports 444, one or more drain valves 446, and a secondary reservoir 460 having a second lubricant level 462. The sump 440 and the secondary reservoir 460 are substantially similar to the sump 340 and the secondary reservoir 360 of FIGS. 3A to 3C, respectively. The plurality of drain ports 444 includes a first drain port 444a, a second drain port 444b, a third drain port 444c, and a fourth drain port 444d. The first drain port 444a, the third drain port 444c, and the fourth drain port 444d are substantially similar to the first drain port 344a, the third drain port 344c, and the fourth drain port 344d of FIGS. 3A to 3C. A position of the second drain port 444b, however, is different than the position of the second drain port 344b, respectively, of FIGS. 3A to 3C. In particular, the second drain port 444b is positioned approximately at the three o'clock position. Such a configuration helps to prevent the lubricant 201 from draining from the gearbox assembly 402 during an in-flight shutdown of the turbine engine (e.g., the turbine engine 10 of FIG. 1) while the turbine engine is windmilling and the gearbox assembly 402 is in the second rotational position or in the third rotational position (e.g., the aircraft is turning, banking, or rolling left or right).

Figure 5A:
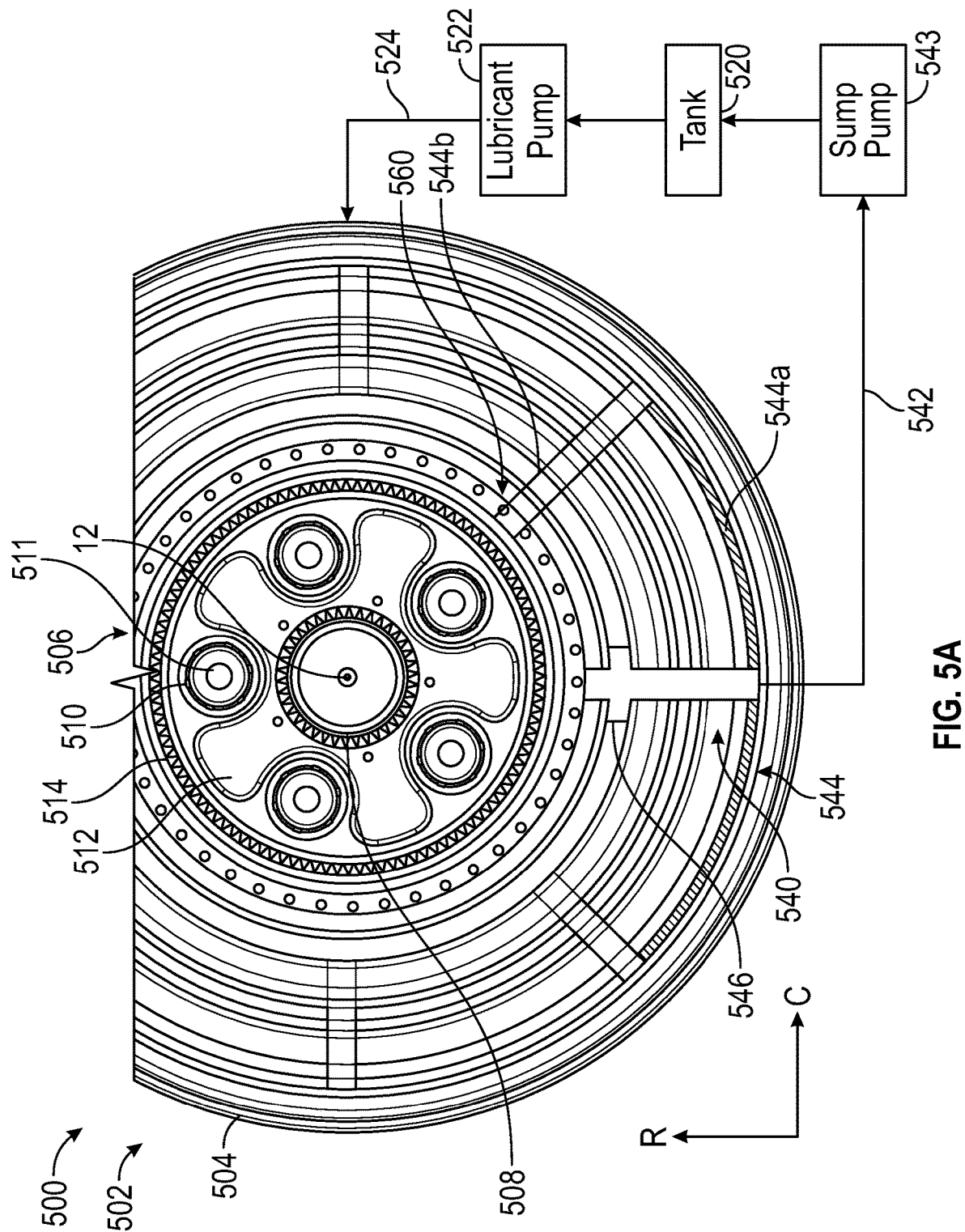
FIG. 5A is a schematic axial end cross-sectional view of a lubrication system for a gearbox assembly, according to another embodiment.
Figure 5B:
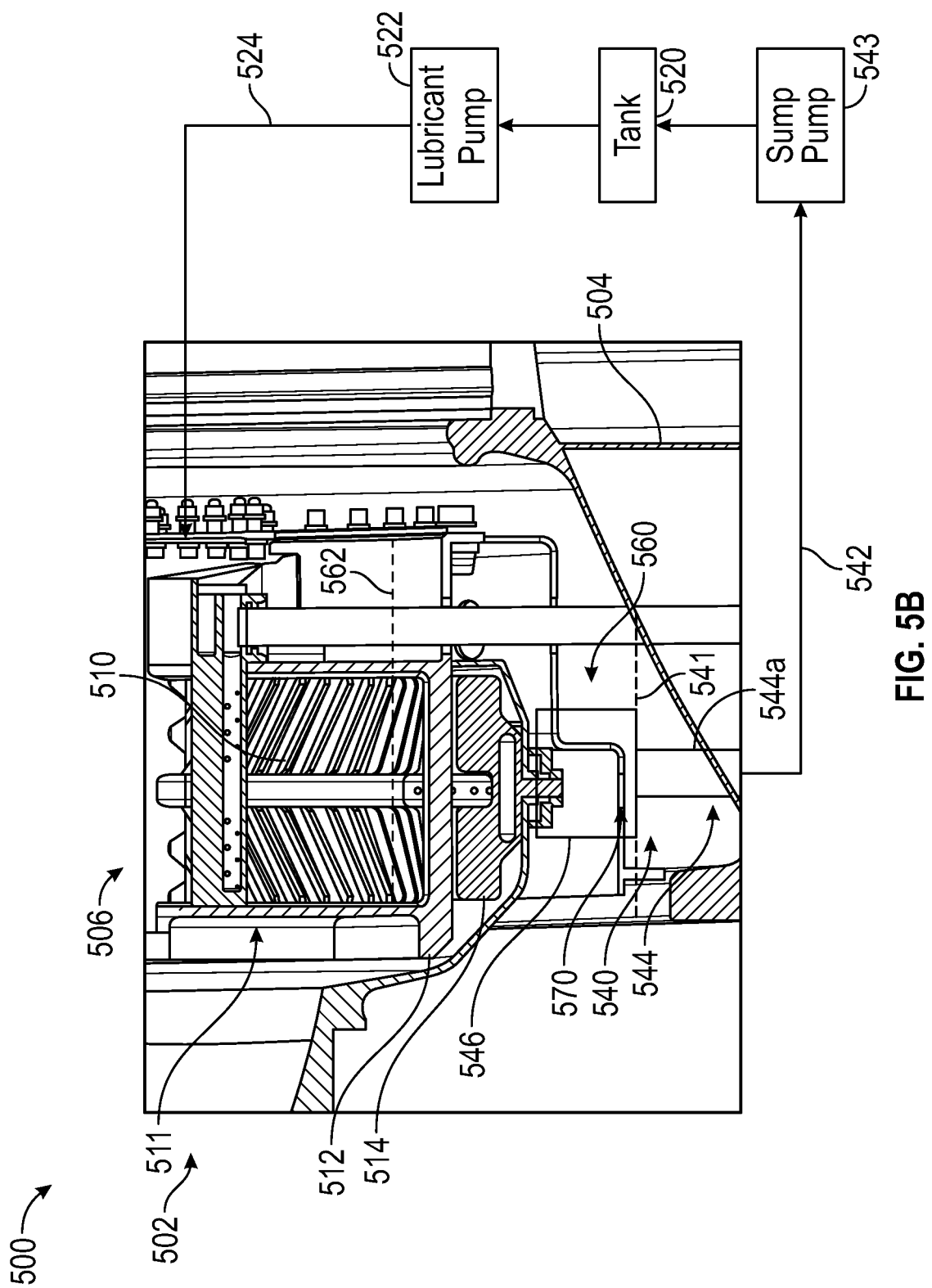
FIG. 5B is a schematic front side cross-sectional view of the lubrication system and the gearbox assembly of FIG. 5A, according to the present disclosure.

FIG. 5A is a schematic axial end cross-sectional view of a lubrication system 500 for a gearbox assembly 502, according to another embodiment. FIG. 5B is a schematic front side cross-sectional view of the lubrication system 500 and the gearbox assembly 502 of FIG. 5A, according to the present disclosure. The lubrication system 500 and the gearbox assembly 502 include many of the same components or similar components as the lubrication system 200 and the gearbox assembly 46 of FIG. 2, respectively.

The gearbox assembly 502 includes a housing 504 and a gear assembly 506. The gear assembly 506 includes a first gear 508, one or more second gears 510 secured by a planet carrier 512, and a third gear 514. Each of the one or more second gears 510 rotates about one or more bearings 511. In FIG. 5A, there are five second gears 510. The lubrication system 500 includes a tank 520, a lubricant pump 522, and a lubricant supply line 524. The lubrication system 500 also includes a sump 540 having a first lubricant level 541 (FIG. 5B), a sump line 542, a sump pump 543, a plurality of drain ports 544, one or more drain valves 546, and a secondary reservoir 560 having a second lubricant level 562 (FIG. 5B). The plurality of drain ports 544 includes a first drain port 544a and a second drain port 544b. The first drain port 544a is a strut drain that forms a portion of a strut. The lubrication system 500 also includes a scavenge gutter 570 (FIG. 5B) that drains the lubricant that sprays off of the gears of the gear assembly 506 as the gears rotate. The scavenger gutter 570 includes one or more apertures in the planet carrier 512 that operably direct the lubricant to the sump 540. The lubrication system 500 and the gearbox assembly 502 operate substantially similarly as the lubrication system 200 and the gearbox assembly 46 of FIG. 2, respectively.

Figure 6:
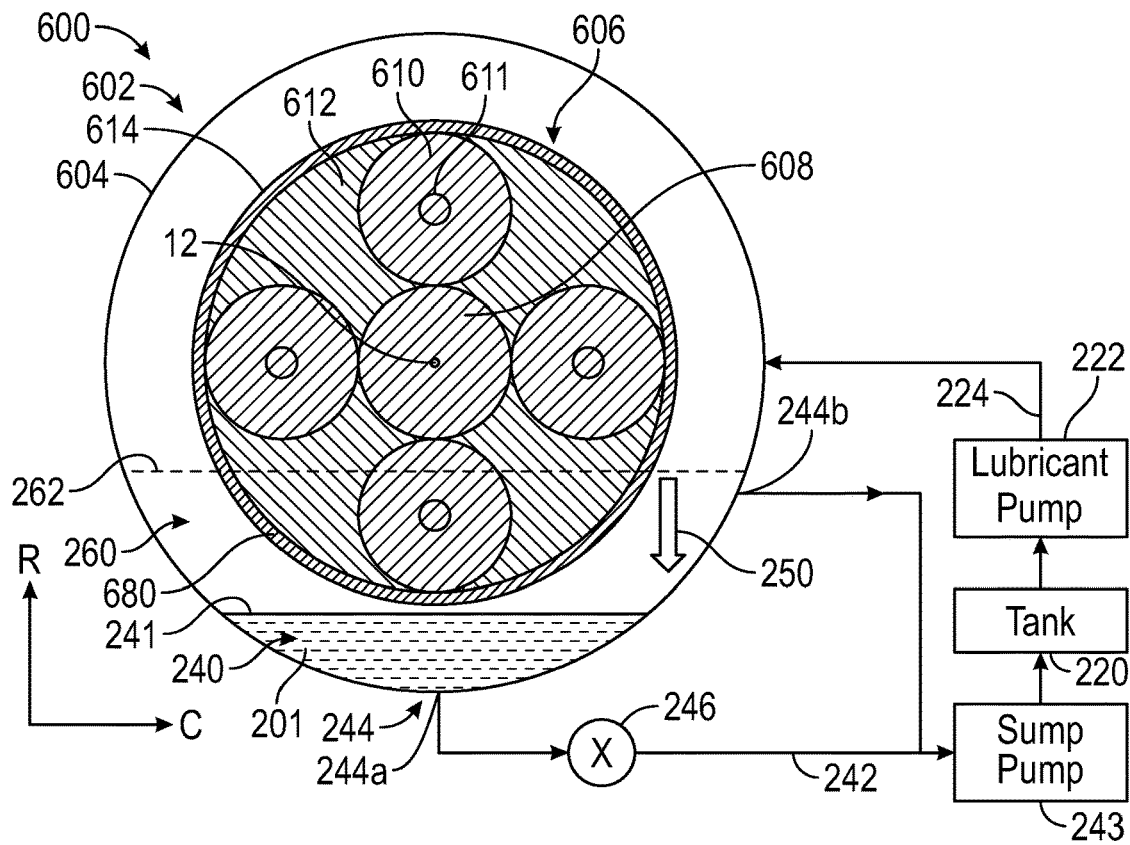
FIG. 6 is a schematic axial end cross-sectional view of a lubrication system for a gearbox assembly, according to another embodiment.

FIG. 6 is a schematic axial end cross-sectional view of a lubrication system 600 for a gearbox assembly 602, according to another embodiment. The lubrication system 600 and the gearbox assembly 602 include many of the same components or similar components as the lubrication system 200 and the gearbox assembly 46 of FIG. 2, respectively.

The gearbox assembly 602 includes a housing 604 and a gear assembly 606. The gear assembly 606 includes a first gear 608, one or more second gears 610 that are secured by a planet carrier 612, and a third gear 614. The one or more second gears 610 include one or more bearings 611 therein such that the one or more second gears 610 rotate about the one or more bearings 611. The lubrication system 600 includes one or more scuppers 680. The one or more scuppers 680 are scoops that scoop the lubricant 201 within the secondary reservoir 260 onto one or more gears of the gear assembly 606. The one or more scuppers 680 are coupled to the third gear 614. The lubrication system 600 and the gearbox assembly 602 operate substantially similarly as do the lubrication system 200 and the gearbox assembly 46 of FIG. 2, respectively.

The one or more scuppers 680 rotate and, as the one or more scuppers 680 rotate, the one or more scuppers 680 pass through the lubricant 201 within the secondary reservoir 260 and scoop, or collect, a portion of the lubricant 201 therein. Rotation of the third gear 614 causes the one or more scuppers 680 to rotate. The one or more scuppers 680 continue to rotate after collecting the portion of the lubricant 201 and distribute the lubricant 201 to at least one of the gears of the gear assembly 606.

Figure 7:
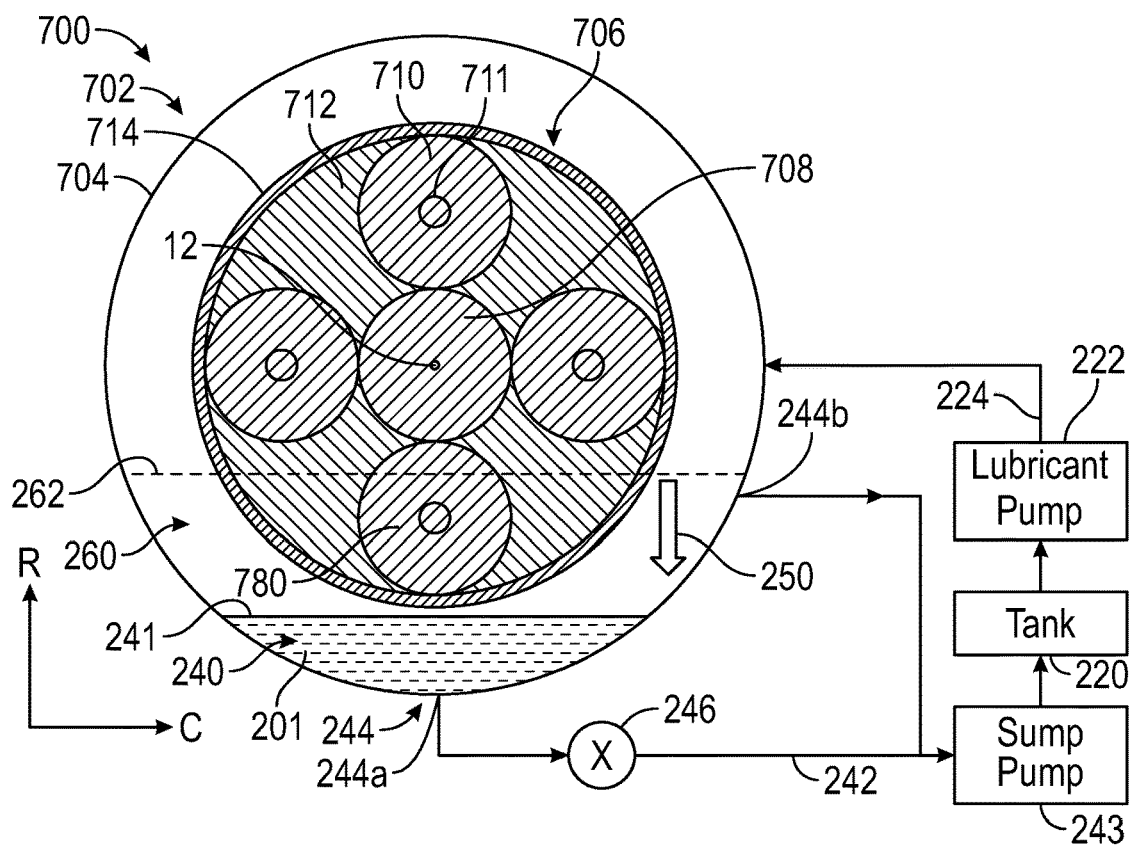
FIG. 7 is a schematic axial end cross-sectional view of a lubrication system for a gearbox assembly, according to another embodiment.

FIG. 7 is a schematic axial end cross-sectional view of a lubrication system 700 for a gearbox assembly 702, according to another embodiment. The lubrication system 700 and the gearbox assembly 702 include many of the same components or similar components as the lubrication system 200 and the gearbox assembly 46 of FIG. 2, respectively.

The gearbox assembly 702 includes a housing 704 and a gear assembly 706. The gear assembly 706 includes a first gear 708, one or more second gears 710 that are secured by a planet carrier 712, and a third gear 714. The one or more second gears 710 include one or more bearings 711 therein such that the one or more second gears 710 rotate about the one or more bearings 711. The lubrication system 700 includes one or more scuppers 780. The one or more scuppers 780 are scoops that scoop the lubricant 201 within the secondary reservoir 260 onto one or more gears of the gear assembly 706. The one or more scuppers 780 are coupled to at least one of the one or more second gears 710. The lubrication system 700 and the gearbox assembly 702 operate substantially similarly as do the lubrication system 200 and the gearbox assembly 46 of FIG. 2, respectively.

The one or more scuppers 780 rotate and, as the one or more scuppers 780 rotate, the one or more scuppers 780 pass through the lubricant 201 within the secondary reservoir 260 and scoop, or collect, a portion of the lubricant 201 therein. Rotation of the one or more second gears 710 causes the one or more scuppers 780 to rotate. The one or more scuppers 780 continue to rotate after collecting the portion of the lubricant 201 and distribute the lubricant 201 to at least one of the gears of the gear assembly 706.

Figure 8:
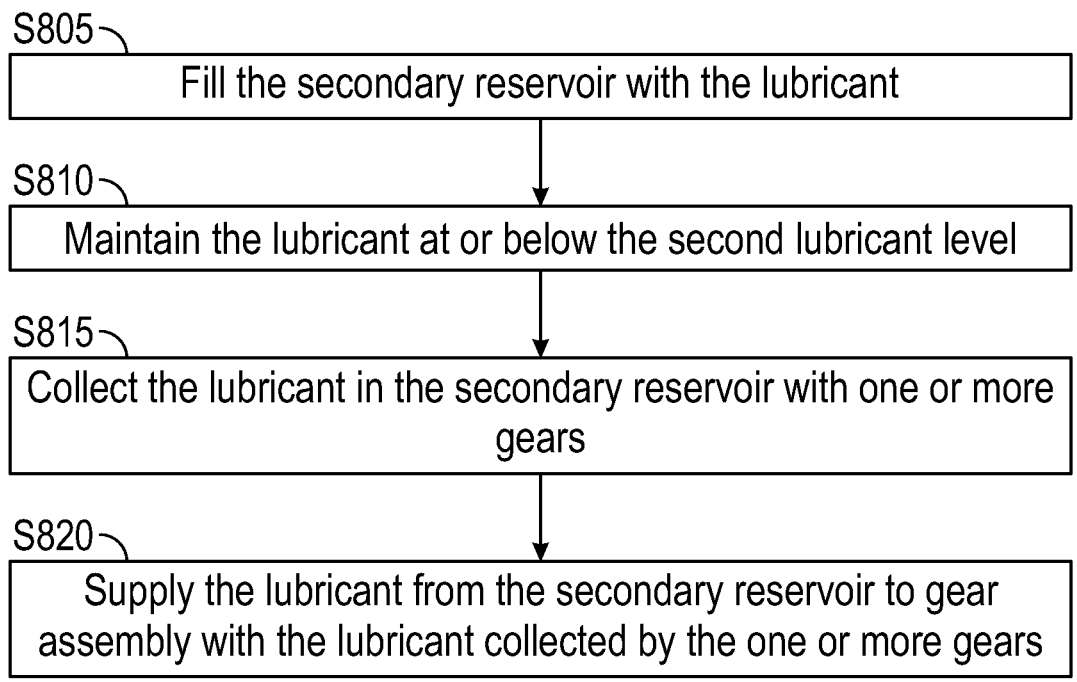
FIG. 8 is a flow chart showing a method of lubrication system shown in any one of FIGS. 2 to 7.

FIG. 8 is a flow chart showing a method of lubrication system shown in any one of FIGS. 2 to 7. Additional details of the method are described above relative to the operation and the description of the aforementioned components. This method may be implemented by the controller 102, and the controller 102 may be configured to perform the steps of the method discussed below. While the following discussion references the lubrication system 200 shown in FIG. 2, this discussion also applies to the other lubrication systems discussed herein. During instances, such as those discussed above, where the lubrication system 200 may be unable to provide the lubricant 201 to the gearbox assembly 46, the secondary reservoir 260 is filled in step S805. The secondary reservoir 260 may be filled by closing the drain valve 246 to prevent lubricant from flowing through the sump line 242 such that the lubricant 201 drains from the gear assembly 206 (as indicated by the arrow 250 in FIG. 2) and fills the secondary reservoir 260. In step S810, the method may include maintaining the lubricant level at or below the second lubricant level 262 by draining the lubricant from the second drain port 244b when the lubricant reaches the positions of the second drain port 244b. With the secondary reservoir 260 filled to the appropriate levels discussed above, the method includes, in step S815, collecting the lubricant 201 in the secondary reservoir 260 with one or more gears of the gear assembly 206 as the gears of the gear assembly 206 rotate through the secondary reservoir 260. The method further includes, in step S820, supplying the lubricant from the secondary reservoir 260 to the gears of the gear assembly 206 and/or to the one or more bearings 211 by distributing the lubricant 201 to the gears of the gear assembly 206 and/or to the one or more bearings 211 through rotation of the gears of the gear assembly 206.

Accordingly, the present disclosure provides for supplying lubricant to the gears or the bearings during shutdown of the turbine engine or other loss of pressure scenarios (e.g., while the turbine engine is operating). The lubrication system herein supplies the lubricant during windmilling and loss of pressure scenarios without utilizing an additional pump, thereby reducing a weight of the turbine engine as compared to turbine engines without the benefit of the present disclosure. The secondary reservoir allows for lubricating the gears and the bearings regardless of the rotation direction of the fan (e.g., left or right), and regardless of the rotational position of the gearbox assembly (e.g., when the aircraft is turning, banking, or rolling).

Further aspects of the present disclosure are provided by the subject matter of the following clauses.

A lubrication system for a gearbox assembly for a turbine engine, the gearbox assembly having a gear assembly including one or more gears and one or more bearings, the lubrication system comprising a sump in fluid communication with the gearbox assembly, the sump being a primary reservoir having a first lubricant level, and a secondary reservoir in the gearbox assembly, the secondary reservoir having a second lubricant level that is greater than the first lubricant level, the lubrication system filling the secondary reservoir with lubricant between the first lubricant level and the second lubricant level such that the one or more gears collects the lubricant in the secondary reservoir to supply the lubricant from the secondary reservoir to the one or more gears or to the one or more bearings.

A lubrication system for a gearbox assembly for a turbine engine, the gearbox assembly having a gear assembly including one or more gears and one or more bearings, the lubrication system comprising a sump in fluid communication with the gearbox assembly, the sump being a primary reservoir having a first lubricant level, a secondary reservoir in the gearbox assembly, the secondary reservoir having a second lubricant level that is greater than the first lubricant level, and a plurality of drain ports including a first drain port in fluid communication with the sump and a second drain port in fluid communication with the secondary reservoir, wherein the lubrication system fills the secondary reservoir with lubricant between the first lubricant level and the second lubricant level and a portion of the lubricant drains through the second drain port, and the one or more gears collects the lubricant in the secondary reservoir to supply the lubricant from the secondary reservoir to the one or more gears or to the one or more bearings.

The lubrication system of any preceding clause, the one or more gears including a first gear, one or more second gears, and a third gear.

The lubrication system of the preceding clause, the first gear being a sun gear, the one or more second gears being planet gears, and the third gear being a ring gear.

The lubrication system of any preceding clause, the gear assembly being an epicyclic gear assembly.

The lubrication system of any preceding clause, the gear assembly coupled to a fan.

The lubrication system of any preceding clause, the lubrication system filling the secondary reservoir with the lubricant during a shutdown of the turbine engine.

The lubrication system of any preceding clause, the one or more bearings being journal bearings.

The lubrication system of any preceding clause, the first gear being coupled to an input shaft of the turbine engine.

The lubrication system of any preceding clause, the one or more second gears being secured by a planet carrier.

The lubrication system of any preceding clause, the planet carrier being coupled to an output shaft of the turbine engine.

The lubrication system of any preceding clause, the third gear being coupled to an output shaft of the turbine engine.

The lubrication system of any preceding clause, the input shaft being a low-pressure shaft of the turbine engine.

The lubrication system of any preceding clause, the output shaft being a fan shaft of the fan.

The lubrication system of any preceding clause, the sump being positioned at approximately a six o'clock position of the gearbox assembly.

The lubrication system of any preceding clause, further comprising a tank that stores the lubricant therein, a lubricant pump, and a lubricant supply line in fluid communication with the tank and the gearbox assembly.

The lubrication system of any preceding clause, the lubricant pump pumping the lubricant from the tank to the gearbox assembly through the lubricant supply line during operation of the turbine engine.

The lubrication system of any preceding clause, the lubricant draining from the gear assembly to fill the sump and the secondary reservoir.

The lubrication system of any preceding clause, the sump including a sump line in fluid communication with the sump and the tank, and the lubricant draining from the sump to the tank through the sump line.

The lubrication system of any preceding clause, further comprising a sump pump in fluid communication with the sump and the sump line, the sump pump pumping the lubricant or air from the sump and through the sump line to the tank.

The lubrication system of any preceding clause, the sump line including a plurality of drain ports in fluid communication with the sump line and with the gearbox assembly, the lubricant draining through the plurality of drain ports into the sump line.

The lubrication system of any preceding clause, the plurality of drain ports including a first drain port in fluid communication with the sump and a second drain port in fluid communication with the secondary reservoir.

The lubrication system of any preceding clause, the first drain port being positioned at approximately the six o'clock position of the gearbox assembly.

The lubrication system of any preceding clause, the first drain port being positioned at a bottom of the gearbox assembly.

The lubrication system of any preceding clause, the second drain port being positioned radially above the first drain port and in fluid communication with the secondary reservoir.

The lubrication system of any preceding clause, the second drain port being positioned at approximately the second lubricant level such that the lubricant drains through the second drain port at the second lubricant level.

The lubrication system of any preceding clause, the second drain port being positioned between a three o'clock position and a four o'clock position of the gearbox assembly.

The lubrication system of any preceding clause, further comprising one or more drain valves within the sump line, the one or more drain valves opening to allow the lubricant to drain through the sump line and closing to prevent the lubricant from draining through the sump line.

The lubrication system of the preceding clause, the one or more drain valves opening or closing based on at least one of a pressure of the lubricant in the lubrication system, a pressure of fuel in the turbine engine, or a pressure of hydraulics in the turbine engine.

The lubrication system of any preceding clause, the one or more drain valves opening to allow the lubricant to drain through the sump line when the at least one of the pressure of the lubricant in the lubrication system, the pressure of the fuel in the turbine engine, or the pressure of the hydraulics in the turbine engine is greater than a pressure threshold.

The lubrication system of any preceding clause, the one or more drain valves closing to prevent the lubricant from draining through the sump line when the at least one of the pressure of the lubricant in the lubrication system, the pressure of the fuel in the turbine engine, or the pressure of the hydraulics in the turbine engine is less than the pressure threshold.

The lubrication system of any preceding clause, further comprising a controller that controls the one or more drain valves to open and to close.

The lubrication system of any preceding clause, the lubrication system supplying the lubricant to the gearbox assembly through the lubricant supply line during operation of the turbine engine.

The lubrication system of any preceding clause, the lubrication system filling the secondary reservoir at a shutdown of the turbine engine.

The lubrication system of any preceding clause, the one or more drain valves closing to prevent the lubricant from draining through the sump line to fill the secondary reservoir.

The lubrication system of any preceding clause, the lubrication system supplying the lubricant to the one or more gears or to the one or more bearings during windmilling of the fan.

The lubrication system of any preceding clause, the one or more drain valves opening when the controller is powered on.

The lubrication system of any preceding clause, the controller powering on when a speed of a turbo-engine of the turbine engine is 5% to 10% of a maximum speed of the turbo-engine.

The lubrication system of any preceding clause, the one or more drain valves closing when the controller powers off.

The lubrication system of any preceding clause, the controller powering off when the speed of the turbo-engine is less than 5% of the maximum speed of the turbo-engine.

The lubrication system of any preceding clause, the first lubricant level of the sump being below the gears of the gear assembly such that the gears are prevented from contacting the lubricant in the sump during operation of the turbine engine.

The lubrication system of any preceding clause, the second lubricant level of the secondary reservoir being positioned such that the lubricant in the secondary reservoir contacts at least a portion of the one or more gears.

The lubrication system of any preceding clause, the plurality of drain ports including a third drain port and a fourth drain port in fluid communication with the gearbox assembly and the sump line.

The lubrication system of any preceding clause, the third drain port being positioned on a first circumferential side of the first drain port, and the fourth drain port being positioned on a second circumferential side of the first drain port.

The lubrication system of any preceding clause, the fourth drain port being positioned between the first drain port and the second drain port.

The lubrication system of any preceding clause, the third drain port being positioned between the six o'clock positioned and a nine o'clock position of the gearbox assembly.

The lubrication system of any preceding clause, the fourth drain port being positioned between the six o'clock position and the three o'clock position.

The lubrication system of any preceding clause, the lubricant draining through the first drain port when the gearbox assembly is at a first rotational position.

The lubrication system of any preceding clause, the lubricant draining through the third drain port when the gearbox assembly is at a second rotational position.

The lubrication system of any preceding clause, the lubricant draining through the fourth drain port when the gearbox assembly is at a third rotational position.

The lubrication system of any preceding clause, each of the plurality of drain ports including a drain valve of the one or more drain valves for allowing the lubricant to drain through each of the plurality of drain ports when the drain valve is open and preventing the lubricant from draining through each of the plurality of drain ports when the drain valve is closed.

The lubrication system of any preceding clause, the first drain port being a strut drain.

The lubrication system of any preceding clause, further comprising a scavenge gutter that drains the lubricant that sprays off of the gears of the gear assembly.

The lubrication system of any preceding clause, wherein the turbine engine includes a fan and a turbo-engine, the fan being coupled to the turbo-engine through the gearbox assembly.

The lubrication system of any preceding clause, wherein the first lubricant level of the sump is below the one or more gears of the gear assembly such that the one or more gears are prevented from contacting the lubricant in the sump during operation of the turbine engine, and the second lubricant level is being positioned such that the lubricant in the secondary reservoir contacts at least a portion of the one or more gears.

The lubrication system of any preceding clause, wherein the second drain port is positioned approximately at the second lubricant level such that the lubricant drains through the second drain port at the second lubricant level.

The lubrication system of any preceding clause, wherein the plurality of drain ports include a third drain port positioned on a first circumferential side of the first drain port, and a fourth drain port positioned on a second circumferential side of the first drain port, the lubricant draining through the third drain port or the fourth drain port when the gearbox assembly rotates clockwise or counterclockwise.

The lubrication system of any preceding clause, further comprising a tank that stores the lubricant therein, a lubricant pump, and a lubricant supply line in fluid communication with the tank and the gearbox assembly, the lubricant pump pumping the lubricant from the tank to the gearbox assembly through the lubricant supply line during operation of the turbine engine.

The lubrication system of any preceding clause, wherein the sump includes a sump line in fluid communication with the sump and the tank, and the lubricant drains from the sump to the tank through the sump line.

The lubrication system of any preceding clause, wherein the plurality of drain ports are in fluid communication with the sump line, the lubricant draining through the plurality of drain ports into the sump line.

The lubrication system of any preceding clause, further comprising one or more drain valves within the sump line, the one or more drain valves opening to allow the lubricant to drain through the sump line and closing to prevent the lubricant from draining through the sump line.

The lubrication system of any preceding clause, wherein the one or more drain valves open or close based on at least one of a pressure of the lubricant in the lubrication system, a pressure of fuel in the turbine engine, or a pressure of hydraulics in the turbine engine.

A turbine engine comprising a fan and a turbo-engine, a gearbox assembly, and a lubrication system. The fan being coupled to the turbo-engine through the gearbox assembly. The gearbox assembly including one or more gears and one or more bearings. The lubrication system being the lubrication system of any preceding clause.

A method of operating the lubrication system of any preceding clause, the method comprising filling the secondary reservoir with the lubricant between the first lubricant level and the second lubricant level, collecting the lubricant in the secondary reservoir with the one or more gears, and supplying the lubricant from the secondary reservoir to the one or more gears or to the one or more bearings with the lubricant collected by the one or more gears.

A method of operating the lubrication system of any preceding clause, the method comprising filling the secondary reservoir with the lubricant between the first lubricant level and the second lubricant level, draining a portion of the lubricant from the secondary reservoir through the second drain port, collecting the lubricant in the secondary reservoir with the one or more gears, and supplying the lubricant from the secondary reservoir to the one or more gears or to the one or more bearings with the lubricant collected by the one or more gears.

The method of any preceding clause, further comprising filling the secondary reservoir with the lubricant during a shutdown of the turbine engine.

The method of any preceding clause, the lubrication system further comprising a tank that stores the lubricant therein, a lubricant pump, and a lubricant supply line in fluid communication with the tank and the gearbox assembly, the method further comprising pumping the lubricant from the tank to the gearbox assembly through the lubricant supply line during operation of the turbine engine.

The method of any preceding clause, further comprising draining the lubricant from the gear assembly to fill the sump and the secondary reservoir.

The method of any preceding clause, the sump including a sump line in fluid communication with the sump and the tank, the method further comprising draining the lubricant from the sump to the tank through the sump line.

The method of any preceding clause, the lubrication system further comprising a sump pump in fluid communication with the sump and the sump line, the method further comprising pumping, with the sump pump, the lubricant or air from the sump through the sump line to the tank.

The method of any preceding clause, the sump line including a plurality of drain ports in fluid communication with the sump line and with the gearbox assembly, the method further comprising draining the lubricant through the plurality of drain ports into the sump line.

The method of any preceding clause, the plurality of drain ports including a first drain port in fluid communication with the sump and a second drain port in fluid communication with the secondary reservoir.

The method of any preceding clause, the lubrication system further comprising one or more drain valves within the sump line, the method further comprising opening the one or more drain valves to allow the lubricant to drain through the sump line, and closing the one or more drain valves to prevent the lubricant from draining through the sump line.

The method of any preceding clause, further comprising opening and closing the one or more drain valves based on at least one of a pressure of the lubricant in the lubrication system, a pressure of fuel in the turbine engine, or a pressure of hydraulics in the turbine engine.

The method of any preceding clause, further comprising opening the one or more drain valves to allow the lubricant to drain through the sump line when the at least one of the pressure of the lubricant in the lubrication system, the pressure of the fuel in the turbine engine, or the pressure of the hydraulics in the turbine engine is greater than a pressure threshold.

The method of any preceding clause, further comprising closing the one or more drain valves to prevent the lubricant from draining through the sump line when the at least one of the pressure of the lubricant in the lubrication system, the pressure of the fuel in the turbine engine, or the pressure of the hydraulics in the turbine engine is less than the pressure threshold.

The method of any preceding clause, further comprising controlling, with a controller, the one or more drain valves to open and to close the one or more drain valves.

The method of any preceding clause, further comprising supplying the lubricant to the gearbox assembly through the lubricant supply line during operation of the turbine engine.

The method of any preceding clause, further comprising filling the secondary reservoir at a shutdown of the turbine engine.

The method of any preceding clause, further comprising closing the one or more drain valves to prevent the lubricant from draining through the sump line to fill the secondary reservoir.

The method of any preceding clause, further comprising supplying the lubricant to the one or more gears or to the one or more bearings during windmilling of the fan.

The method of any preceding clause, further comprising opening when the controller is powered on.

The method of any preceding clause, further comprising powering the controller on when a speed of a turbo-engine of the turbine engine is 5% to 10% of a maximum speed of the turbo-engine.

The method of any preceding clause, further comprising closing the one or more drain valves when the controller powers off.

The method of any preceding clause, further comprising powering off the controller when the speed of the turbo-engine is less than 5% of the maximum speed of the turbo-engine.

The method of any preceding clause, the first lubricant level of the sump being below the gears of the gear assembly such that the gears are prevented from contacting the lubricant in the sump during operation of the turbine engine.

The method of any preceding clause, the second lubricant level of the secondary reservoir being positioned such that the lubricant in the secondary reservoir contacts at least a portion of the one or more gears.

The method of any preceding clause, the plurality of drain ports including a third drain port and a fourth drain port in fluid communication with the gearbox assembly and the sump line.

The method of any preceding clause, further comprising draining the lubricant through the first drain port when the gearbox assembly is at a first rotational position.

The method of any preceding clause, further comprising draining the lubricant through the third drain port when the gearbox assembly is at a second rotational position.

The method of any preceding clause, further comprising draining the lubricant through the fourth drain port when the gearbox assembly is at a third rotational position.

The method of any preceding clause, each of the plurality of drain ports including a drain valve of the one or more drain valves for allowing the lubricant to drain through each of the plurality of drain ports when the drain valve is open and preventing the lubricant from draining through each of the plurality of drain ports when the drain valve is closed.

The method of any preceding clause, further comprising draining the lubricant that sprays off of the gears of the gear assembly through a scavenge gutter.

The method of any preceding clause, wherein the first lubricant level of the sump is below the gears of the gear assembly such that the gears are prevented from contacting the lubricant in the sump during operation of the turbine engine, and the second lubricant level of the secondary reservoir being positioned such that the lubricant in the secondary reservoir contacts at least a portion of the one or more gears.

The method of any preceding clause, wherein the second drain port is positioned approximately at the second lubricant level, and the method further comprises draining the lubricant from the secondary reservoir through the second drain port at the second lubricant level.

The method of any preceding clause, wherein the plurality of drain ports include a third drain port positioned on a first circumferential side of the first drain port, and a fourth drain port positioned on a second circumferential side of the first drain port, and the method further comprises draining the lubricant through the third drain port or the fourth drain port when the gearbox assembly rotates clockwise or counterclockwise.

The method of any preceding clause, wherein the lubrication system further includes a tank that stores the lubricant therein, a lubricant pump, and a lubricant supply line in fluid communication with the tank and the gearbox assembly, and the method further comprises pumping, with the lubricant pump, the lubricant from the tank to the gearbox assembly through the lubricant supply line during operation of the turbine engine.

The method of any preceding clause, wherein the sump includes a sump line in fluid communication with the sump and the tank, and the method further comprises draining the lubricant from the sump to the tank through the sump line.

The method of any preceding clause, wherein the plurality of drain ports are in fluid communication with the sump line, and the method further comprises draining the lubricant through the plurality of drain ports into the sump line.

The method of any preceding clause, wherein the lubrication system includes one or more drain valves within the sump line, and the method further comprises opening the one or more drain valves to allow the lubricant to drain through the sump line, and closing the one or more drain valves to prevent the lubricant from draining through the sump line.

The method of any preceding clause, further comprising opening or closing the one or more drain valves based on at least one of a pressure of the lubricant in the lubrication system, a pressure of fuel in the turbine engine, or a pressure of hydraulics in the turbine engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a gearbox assembly for a turbine engine, the gearbox assembly having a gear assembly including one or more gears and one or more bearings, the lubrication system comprising:
   a sump in fluid communication with the gearbox assembly, the sump being a primary reservoir having a first lubricant level;
   a secondary reservoir in the gearbox assembly, the secondary reservoir having a second lubricant level that is greater than the first lubricant level;
   a first drain port in fluid communication with the sump; and
   a second drain port in fluid communication with the secondary reservoir,
   wherein the lubrication system fills the secondary reservoir with a lubricant between the first lubricant level and the second lubricant level and a portion of the lubricant drains through the second drain port, and the one or more gears collects the lubricant in the secondary reservoir to supply the lubricant from the secondary reservoir to the one or more gears or to the one or more bearings.

2. The lubrication system of claim 1, wherein the turbine engine includes a fan and a turbo-engine, the fan being coupled to the turbo-engine through the gearbox assembly.

3. The lubrication system of claim 1, wherein the first lubricant level of the sump is below the one or more gears of the gear assembly such that the one or more gears are prevented from contacting the lubricant in the sump during operation of the turbine engine, and the second lubricant level is positioned such that the lubricant in the secondary reservoir contacts at least a portion of the one or more gears.

4. The lubrication system of claim 1, wherein the second drain port is positioned approximately at the second lubricant level such that the lubricant drains through the second drain port at the second lubricant level.

5. The lubrication system of claim 1, further comprising:
   a third drain port positioned on a first circumferential side of the first drain port; and
   a fourth drain port positioned on a second circumferential side of the first drain port,
   wherein the lubricant drains through the third drain port or the fourth drain port when the gearbox assembly rotates clockwise or counterclockwise.

6. The lubrication system of claim 1, further comprising a tank that stores the lubricant therein, a lubricant pump, and a lubricant supply line in fluid communication with the tank and the gearbox assembly, the lubricant pump pumping the lubricant from the tank to the gearbox assembly through the lubricant supply line during operation of the turbine engine.

7. The lubrication system of claim 6, wherein the sump includes a sump line in fluid communication with the sump and the tank, and the lubricant drains from the sump to the tank through the sump line.

8. The lubrication system of claim 7, wherein the first drain port and the second drain port are in fluid communication with the sump line, the lubricant draining through the first drain port and the second drain port into the sump line.

9. The lubrication system of claim 7, further comprising a drain valve within the sump line, the drain valve opening to allow the lubricant to drain through the sump line and closing to prevent the lubricant from draining through the sump line.

10. The lubrication system of claim 9, wherein the drain valve opens or closes based on at least one of a pressure of the lubricant in the lubrication system, a pressure of fuel in the turbine engine, or a pressure of hydraulics in the turbine engine.

11. A method of operating a lubrication system for a gearbox assembly of a turbine engine, the method comprising:
providing the lubrication system, the lubrication system including:
a sump in fluid communication with the gearbox assembly, the sump being a primary reservoir having a first lubricant level;
a secondary reservoir in the gearbox assembly, the secondary reservoir having a second lubricant level that is greater than the first lubricant level;
a first drain port in fluid communication with the sump;
a second drain port in fluid communication with the secondary reservoir;
filling the secondary reservoir with a lubricant between the first lubricant level and the second lubricant level;
collecting the lubricant in the secondary reservoir with one or more gears of the gearbox assembly; and
supplying the lubricant from the secondary reservoir to the one or more gears or to one or more bearings with the lubricant collected by the one or more gears.

12. The method of claim 11, further comprising draining the lubricant from the gear assembly to fill the sump and the secondary reservoir.

13. The method of claim 11, wherein the first lubricant level of the sump is below the one or more gears of the gear assembly such that the one or more gears are prevented from contacting the lubricant in the sump during operation of the turbine engine, and the second lubricant level of the secondary reservoir is positioned such that the lubricant in the secondary reservoir contacts at least a portion of the one or more gears.

14. The method of claim 11, wherein the second drain port is positioned approximately at the second lubricant level, and the method further comprises maintaining the lubricant at or below the second lubricant level by draining the lubricant from the secondary reservoir through the second drain port when the lubricant fills the secondary reservoir to the second drain port.

15. The method of claim 11, wherein a third drain port is positioned on a first circumferential side of the first drain port and a fourth drain port is positioned on a second circumferential side of the first drain port, and the method further comprises draining the lubricant through the third drain port or the fourth drain port when the gearbox assembly rotates clockwise or counterclockwise.

16. The method of claim 11, wherein the lubrication system further includes a tank that stores the lubricant therein, a lubricant pump, and a lubricant supply line in fluid communication with the tank and the gearbox assembly, and the method further comprises pumping, with the lubricant pump, the lubricant from the tank to the gearbox assembly through the lubricant supply line during operation of the turbine engine.

17. The method of claim 16, wherein the sump includes a sump line in fluid communication with the sump and the tank, and the method further comprises draining the lubricant from the sump to the tank through the sump line.

18. The method of claim 17, wherein the first drain port and the second drain port are in fluid communication with the sump line, and the method further comprises draining the lubricant through the first drain port and the second drain port into the sump line.

19. The method of claim 18, wherein the lubrication system includes a drain valve within the sump line, and the method further comprises opening the drain valve to allow the lubricant to drain through the sump line, and closing the drain valve to prevent the lubricant from draining through the sump line.

20. The method of claim 19, further comprising opening or closing the drain valve based on at least one of a pressure of the lubricant in the lubrication system, a pressure of fuel in the turbine engine, or a pressure of hydraulics in the turbine engine.

* * * * *